United States Patent
Pearson

(10) Patent No.: US 10,094,947 B2
(45) Date of Patent: Oct. 9, 2018

(54) SYSTEM AND METHOD FOR LOCATING UNDERGROUND LINES USING ANTENNA AND POSITIONING INFORMATION

(71) Applicant: Metrotech Corporation, Santa Clara, CA (US)

(72) Inventor: Richard Pearson, Bristol (GB)

(73) Assignee: METROTECH CORPORATION, Santa Clara, CA (US)

( * ) Notice: Subject to any disclaimer, the term of this patent is extended or adjusted under 35 U.S.C. 154(b) by 0 days.

(21) Appl. No.: 15/287,551

(22) Filed: Oct. 6, 2016

(65) Prior Publication Data
US 2017/0102477 A1 Apr. 13, 2017

Related U.S. Application Data

(60) Provisional application No. 62/238,466, filed on Oct. 7, 2015.

(51) Int. Cl.
*G01V 3/06* (2006.01)
*G01V 3/08* (2006.01)
*G01V 3/10* (2006.01)

(52) U.S. Cl.
CPC .............. *G01V 3/10* (2013.01); *G01V 3/06* (2013.01); *G01V 3/081* (2013.01)

(58) Field of Classification Search
CPC ... G01V 3/15; G01V 3/06; G01V 3/10; G01V 3/081
USPC ........................................................ 324/326
See application file for complete search history.

(56) References Cited

U.S. PATENT DOCUMENTS

| 6,529,006 | B1* | 3/2003 | Hayes | G01V 3/104 |
| | | | | 324/326 |
| 7,285,958 | B2* | 10/2007 | Overby | F16L 1/11 |
| | | | | 324/326 |
| 2006/0026020 | A1 | 2/2006 | Waite et al. | |
| 2006/0178849 | A1 | 8/2006 | Maier et al. | |
| 2010/0004880 | A1 | 1/2010 | Royle et al. | |
| 2012/0143532 | A1 | 6/2012 | Pearson | |

OTHER PUBLICATIONS

International Search Report for PCT Application No. PCT/US2016/056071 issued by the US Searching Authority dated Dec. 27, 2016, pp. 1-2.
Written Opinion of the International Searching Authority for PCT Application No. PCT/US2016/056071 issued by the US Searching Authority dated Dec. 27, 2016, pp. 1-2.

* cited by examiner

*Primary Examiner* — Reena Aurora
(74) *Attorney, Agent, or Firm* — Haynes and Boone, LLP.

(57) ABSTRACT

A system and method of for underground line location includes an underground line locator. The underground line locator includes an antenna system configured to generate signal information based on a proximity and an orientation of an underground line relative to the antenna system, a positioning system configured to generate position information based on the location of the underground line locator, and a controller coupled to the antenna system and the positioning system. The controller is configured to receive the signal information from the antenna system and the positioning information from the positioning system.

9 Claims, 6 Drawing Sheets

SYSTEM AND METHOD FOR LOCATING UNDERGROUND LINES USING ANTENNA AND POSITIONING INFORMATION

RELATED APPLICATIONS

The present application claims priority to U.S. Provisional Application Ser. No. 62/238,466, filed on Oct. 7, 2015, which is herein incorporated by reference in its entirety.

TECHNICAL FIELD

The present disclosure relates generally to underground line location and more particularly to underground line location using antenna and positioning information.

BACKGROUND

An underground line locator, such as utility line locator, is a portable manually moveable instrument used to detect signals generated by underground lines, such as utility pipes, cables, and/or the like. The signals generated by the underground lines may include, for example, alternating magnetic fields produced by alternating currents transmitted through buried conductive lines. Based on the detected signals, underground line locators are used to determine the location of underground lines that would otherwise be difficult to locate. The ability to accurately locate underground lines is highly desirable in many applications. For example, inadvertently digging into an electrical and/or gas line may result in fires, toxic emissions, damage to the digging equipment, damage to the utility line, and/or the like. Furthermore, the ability to accurately locate underground lines provides greater knowledge about the layout of a site. For example, detailed knowledge about the location of underground lines at a given site may be helpful when planning construction and/or repair projects at the site.

Accordingly, it would be desirable to provide systems and methods for improved underground line locators.

SUMMARY

In some embodiments of the present invention, an underground line locator is presented. An underground line locator according to some embodiments includes a first antenna disposed at a first position, the first antenna determining first signal information associated with an alternating current (AC) magnetic field associated with an underground line; and a second antenna disposed at a second position apart from the first position, the second antenna determining second signal information associated with the AC magnetic field; wherein the first signal information includes a first magnitude and a first angle, and the second signal information includes a second magnitude determined along an axis defined by the first angle.

A method of locating a line according to some embodiments includes receiving, from a first antenna disposed at a first position, first signal information associated with an alternating current (AC) magnetic field associated with an underground line, the first signal information including a first magnitude and a first angle; receiving, from a second antenna disposed at a second position apart from the first position, second signal information associated with the AC magnetic field, the second signal information including a second magnitude determined along an axis defined by the first angle; receiving, from a positioning system, position information, the positioning information being based on the location of the underground line locator; and updating a map of a survey area based on the first and second signal information and the position information.

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
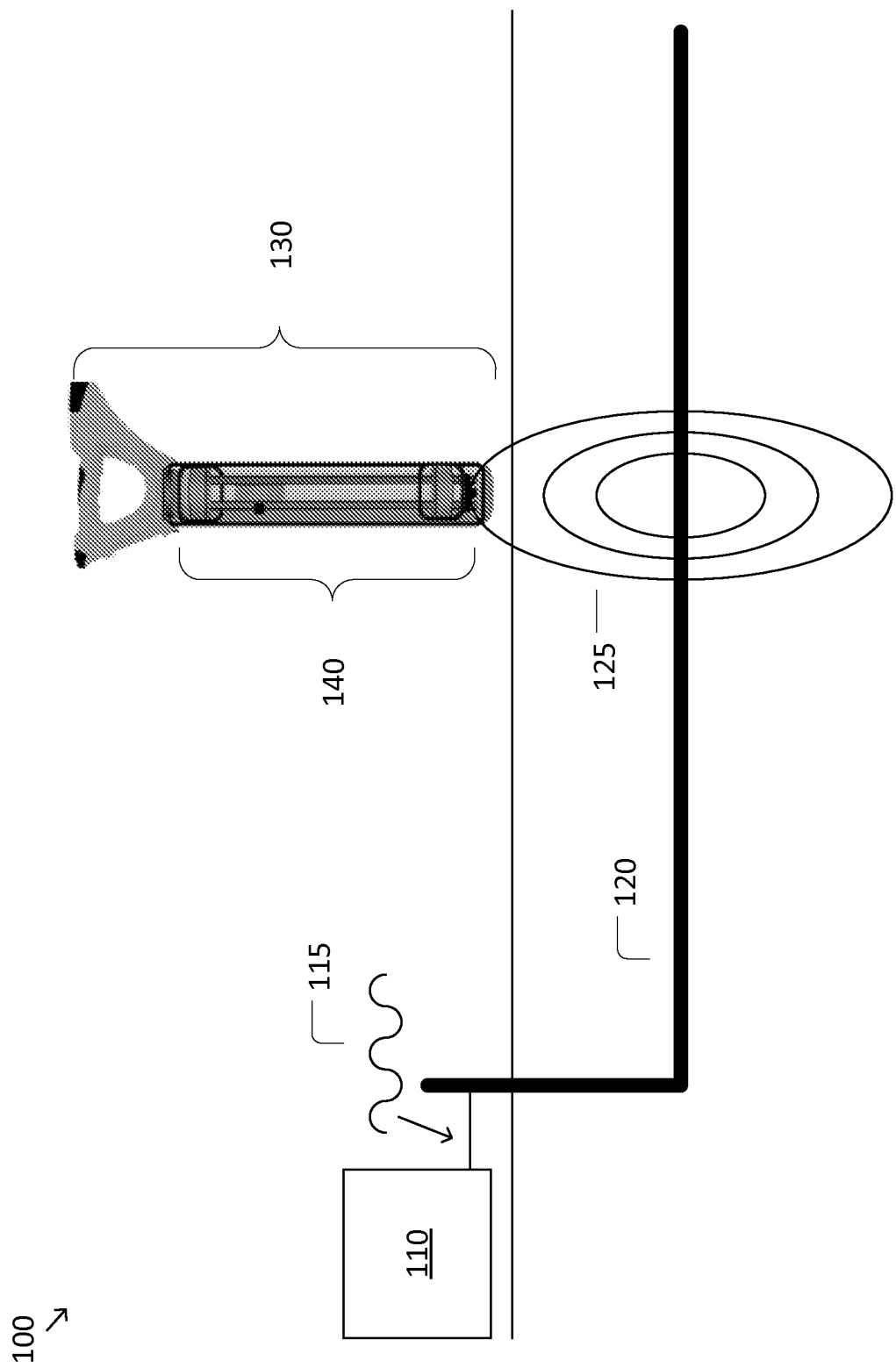
FIG. 1 is a simplified diagram of an underground line locator system according to some embodiments.

FIG. 1 is a simplified diagram of an underground line locator system 100 according to some embodiments. A transmitter 110 couples a locate tone 115 onto one or more underground lines 120. Transmitter 110 may include a signal generator implemented using portable components, components that are fixed to underground line 120, and/or a combination of fixed and portable components. Locate tone 115 may include an alternating current (AC) signal that is generated by transmitter 110 and transmitted through underground line 120. Locate tone 115 may include any suitable time-varying signal, such as an AC waveform at a predetermined frequency, a pulse sequence, a modulated AC waveform carrying information based on its time-varying frequency, amplitude, and/or phase, and/or the like. In some examples, locate tone 115 may be decomposed into in-phase and quadrature components based on a reference phase.

When locate tone 115 is transmitted through underground line 120, a time-varying magnetic field 125 is generated around underground line 120 via electromagnetic induction. A locator 130 including an antenna system 140 is used to detect magnetic field 125 and/or characteristics of magnetic field 125, such as its strength, gradient, and/or direction. Locator 130 may further detect information embedded in a time-varying signal carried by magnetic field 125. Based on the detected characteristics of magnetic field 125, locator 130 determines the location and/or identity of underground line 120. Locator 130 may be a portable underground line locator operated by a user. In some examples, the user may manually move locator 130 around a survey area and record the location of at least a portion of underground line 120 as determined by locator 130. According to some embodiments, locator 130 may provide ease-of-use features that reduce the level of user skill and/or attention used during the operation of locator 130 relative to conventional underground line locators.

Magnetic field 125 is often detected in the presence of field distortion. Known sources of field distortion include other underground lines in the proximity of underground line 120 that may carry bleedover signals and/or return currents based on locate tone 115, changes in direction of underground line 120 (e.g., bends and changes of depth), junctions and branches in a utility network that cause locate tone 115 to become split across other underground lines (e.g., laterals off of underground line 120), airborne signal from transmitter 110, attenuation of magnetic field 125 due to ground conductivity, and/or the like. According to some embodiments, locator 130 may be designed to more accurately locate underground line 120 in the presence of field distortion of magnetic field 125 than conventional underground line locators.

Figure 2:
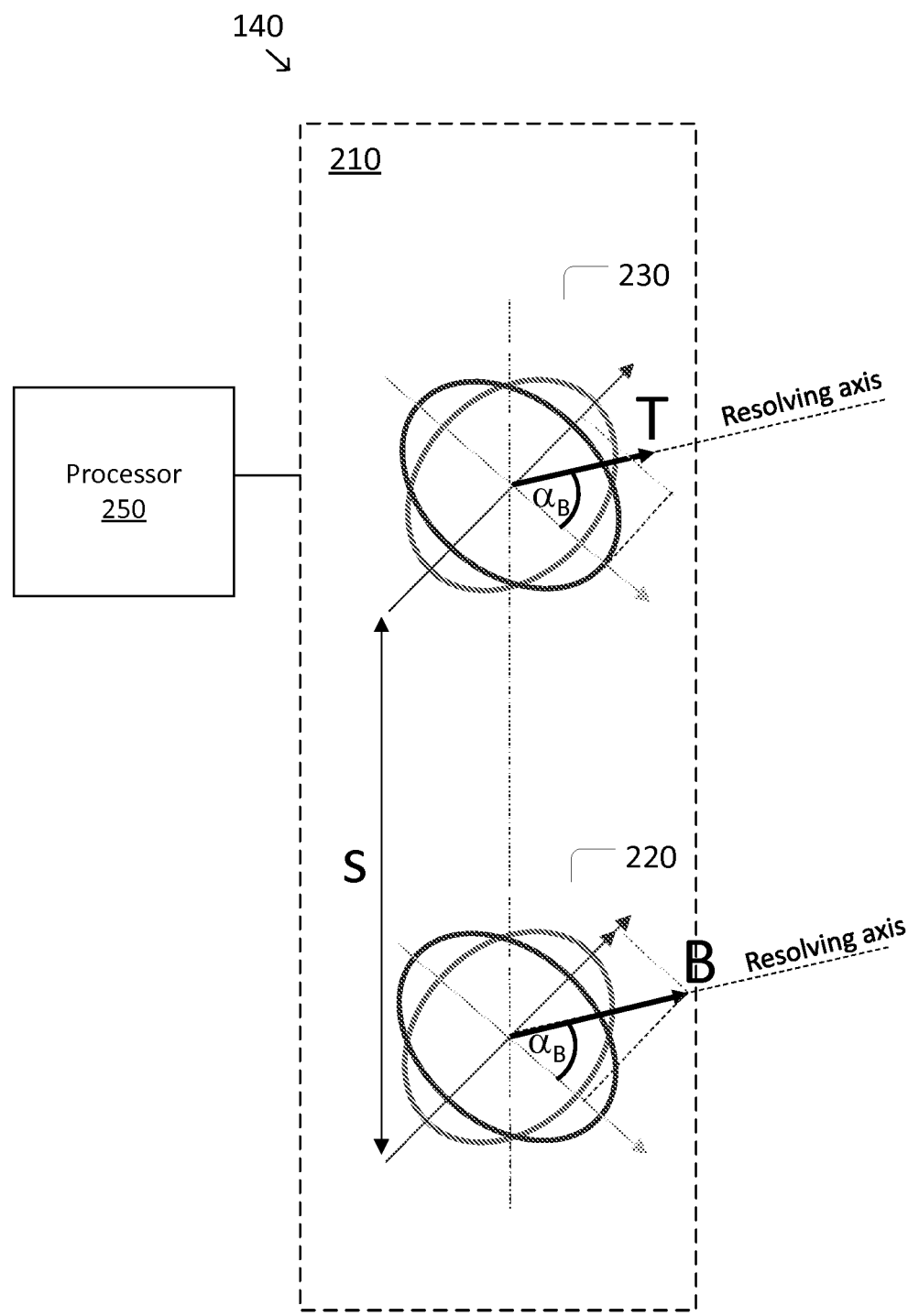
FIG. 2 is a simplified diagram of an antenna system according to some embodiments.

FIG. 2 is a simplified diagram of antenna system 140 according to some embodiments. According to some embodiments, antenna system 140 may include an antenna subsystem 210 communicatively coupled to a processor 250. Processor 250 may include analog and/or digital signal processing hardware and/or software capable of sampling, digitizing, and/or resolving signals received from antenna subsystem 210. Antenna subsystem 210 includes bottom 220 and top 230 dual-axis antennas. Dual-axis antennas 220 and 230 are separated along a vertical axis by a distance 's'. According to some embodiments, the vertical axis may be an elongate (principal) axis of locator 130. Each dual-axis antenna 220 and 230 resolves the strength and direction of magnetic field 125 in any horizontal direction (i.e., any direction perpendicular to the vertical axis). In some embodiments, dual-axis antennas 220 and 230 may include one or more physical antennas. Each physical antenna includes a mechanism for detecting magnetic field 125 and/or characteristics thereof. In some embodiments, the mechanism for detecting magnetic field 125 may include an inductor coil that generates a time-varying current signal proportional to the rate of change of time-varying magnetic field 125 passing through the coil. In some embodiments, the mechanism for detecting magnetic field 125 may include a suitable alternative to an inductor coil, such as a microelectromechanical (MEMS) sensor, Hall effect sensor, and/or the like. The signals generated by the physical antennas may be sampled, digitized, and/or resolved by processor 250 as if they were generated by a single virtual antenna having dual-axis resolution.

According to some embodiments, in order to resolve the strength and direction of magnetic field 125 in any horizontal direction, each dual-axis antenna 220 and 230 may include a crossed pair of physical antennas (i.e. substantially co-located physical antennas oriented along orthogonal horizontal axes), where each physical antenna detects the strength of magnetic field 125 along a single axis. In this configuration, dual-axis antennas 220 and 230 resolve signal information associated with magnetic field 125 when rotated at any angle around the vertical axis. As a result, antenna subsystem 210 provides enhanced immunity to field distortions and reduces the burden on the operator to align the system with magnetic field 125.

Referring to FIG. 2, dual-axis antennas 220 and 230 detect characteristic of magnetic field 125, which may include magnitude (denoted B and T, respectively), phase, and/or angle (denoted a) of magnetic field 125. In some examples, a resolving axis of dual-axis antennas 220 and 230 may be defined based on to the angle detected by bottom dual-axis antenna 220. The projection of the signal T' detected by top dual-axis antenna 230 onto the resolving axis may then be used to determine the magnitude T. Subsequently, the signals T and B may be used to determine a gradient of magnetic field 125 based on the distance 's' between bottom 220 and top 230 dual-axis antennas. The gradient may be used to determine the depth and/or location of underground line 120.

Figure 3:
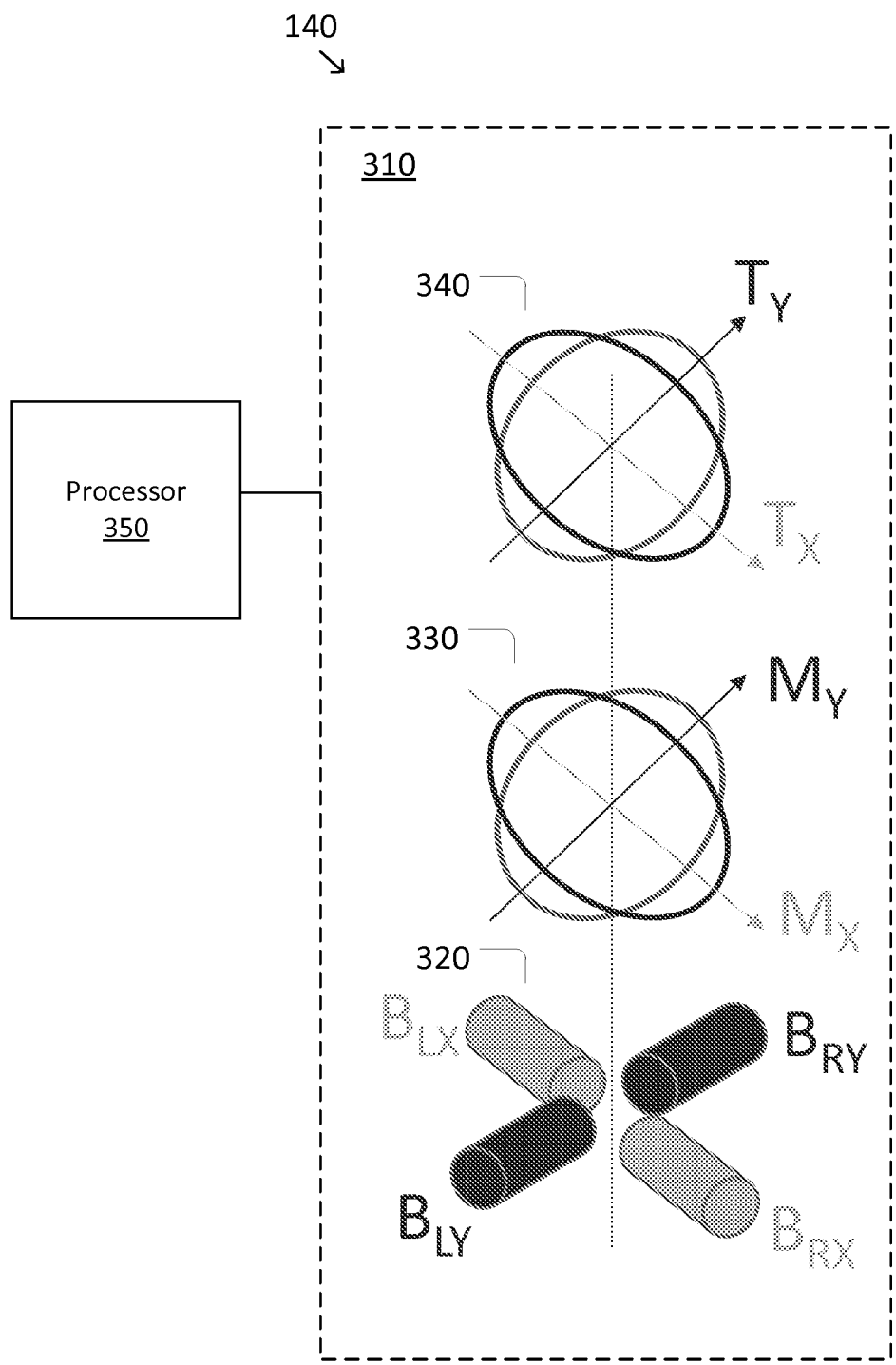
FIG. 3 is a simplified diagram of an antenna system according to some embodiments.

FIG. 3 is a simplified diagram of antenna system 140 according to some embodiments. According to some embodiments, antenna system 140 may include an antenna subsystem 310 communicatively coupled to a processor 350. Processor 350 may include analog and/or digital signal processing hardware and/or software capable of sampling, digitizing, and/or resolving signals received from antenna subsystem 310. Like antenna subsystem 210, as discussed previously with respect to FIG. 2, antenna subsystem 310 includes dual-axis antennas configured to determine characteristics of magnetic field 125 in any horizontal direction. As depicted in FIG. 2, antenna subsystem 310 includes two dual-axis antennas (330 and 340) and one dual-axis left-right antenna 320. Like FIG. 2, dual-axis antennas 330 and 340 include crossed pairs of physical antennas for determining the strength of magnetic field 125 when rotated at any angle. Dual-axis left-right antenna 320 provides distance-proportional left-right guidance information indicating whether and how far underground line 120 is located to the left or right of the user. Dual-axis left-right antenna 320 includes a two pairs of physical antennas, each pair of physical antennas sharing an axis of sensitivity and being spaced apart from one another in a horizontal direction. The two pairs of physical antennas are arranged perpendicular to one another in the horizontal plain. In this configuration, antenna 320 resolves distance-proportional left-right guidance signal information at any angle around the vertical axis. As in FIG. 2, the signals generated by the physical antennas of each of antennas 320-340 may be sampled, digitized, and/or resolved by processor 350 as if they were generated by a virtual antenna having dual-axis resolution.

Figure 4:
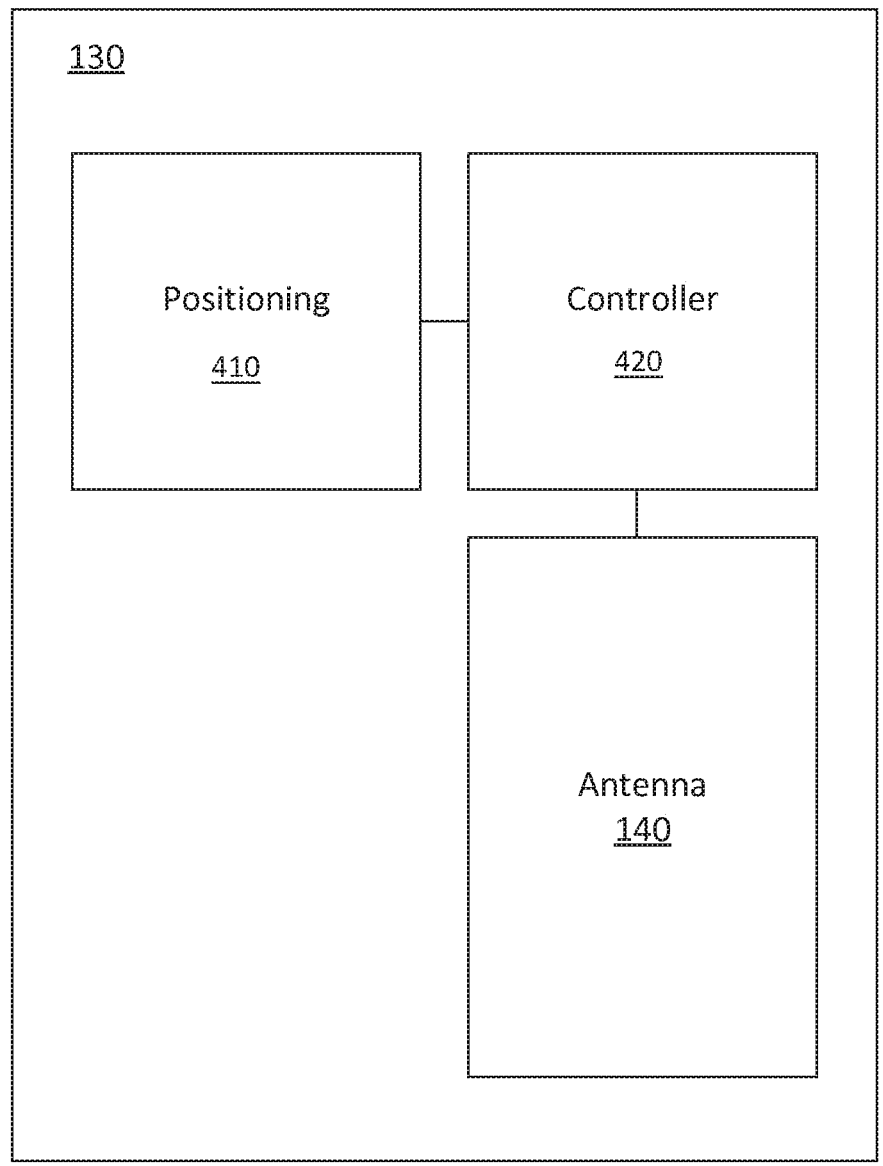
FIG. 4 is a simplified diagram of a locator according to some embodiments.

FIG. 4 is a simplified diagram of locator 130 according to some embodiments. As discussed previously with respect to FIG. 1, locator 130 includes antenna system 140. According to some embodiments, antenna system 140 may include one or more instances of antenna subsystems 210 and/or 310 as discussed with respect to FIGS. 2 and 3. Locator 130 may include a positioning system 410 for determining the position of locator 130 at a given time. Positioning system 410 may include an inertial navigation system, a global positioning system (GPS), differential global positioning system (DGPS), and/or the like. Locator 130 includes a controller 420 coupled to antenna system 140 and positioning system 410. Controller 420 processes, stores, displays, and/or transmits information received from antenna system 140 (e.g., a vector and/or gradient associated with detected magnetic field 125) and information received from positioning system 410 (e.g., GPS coordinates and/or other positioning information). According to some embodiments, controller 420 may sample the information from antenna system 140 and positioning system 410 at regular intervals in time.

Based on the processed information, controller 420 may be configured to generate a map that displays the layout of utility lines detected during a given session at a particular site. As a result, the user is not burdened with the task of remembering where underground lines are located within a given site. In some examples, the user may simply sweep the survey area while holding locator 130 to gradually fill in a detailed map of the site showing the locations of one or more underground lines. The map may be referenced later, for example, by transmitting the information to a remote database and/or the like using a suitable transmission mechanism (e.g. removable memory, wireless Internet connection, Bluetooth communication, a wired input/output port, and/or the like). Although the generation of the maps and guidance information is described as being performed by controller 420, at least some of the processing may instead and/or additionally be performed by an external computing device, such as a smartphone, tablet, personal computer, cloud server, and/or the like in communication with locator 130

Figure 5A:
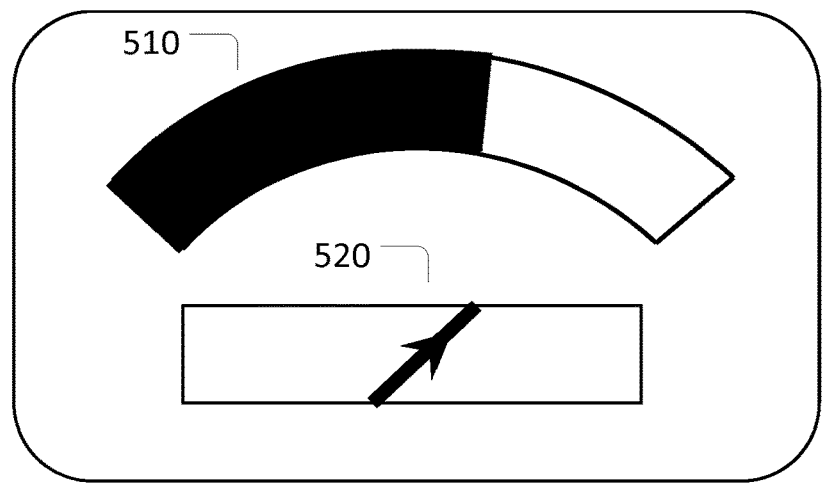
FIGS. 5a and 5b are simplified diagrams of user interfaces of a locator according to some embodiments.
Figure 5B:
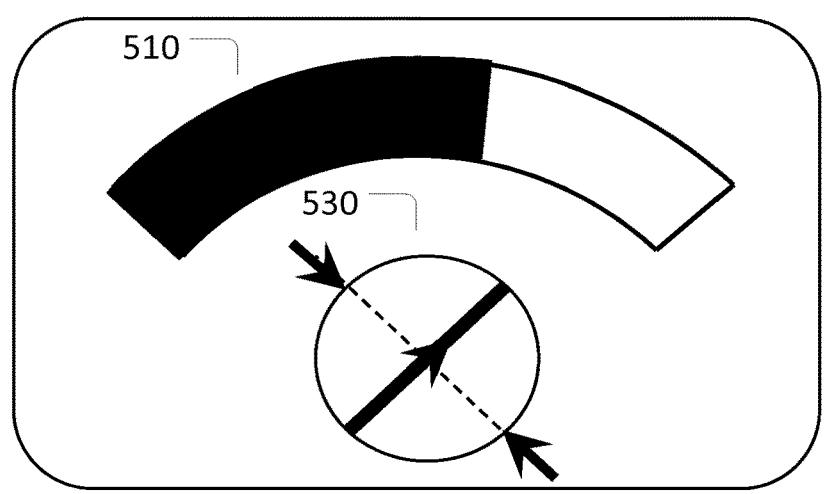

FIGS. 5a and 5b are simplified diagrams of user interfaces 500a and 500b of locator 130 according to some embodiments. According to some embodiments consistent with FIGS. 1-4, locator 130 may utilize one or more of user interfaces 500a and/or 500b to convey information collected by antenna system 140 and/or positioning system 410. User interfaces 500a and 500b include a strength meter 510 indicating the magnitude and/or gradient of the detected signal from an antenna subsystem, such as antenna subsystem 210 and/or 310. User interface 500a includes a letterbox style left-right indicator 520 that simultaneously indicates the orientation of the underground line based on the angle of the indicator and distance-proportional left-right guidance (i.e., an indication of whether and how far the underground line is located to the left or right of the user) based on the horizontal position of the indicator. That is, the indicator in letterbox 520 may both swivel and move left and right within the letterbox. User interface 500b includes a spyglass/compass style left-right indicator 530 that indicates the orientation of the underground line based on the angle of the indicator (the arrow inside the circle) and distance-proportional left-right guidance based on the guidance arrows (the arrows outside the circle).

Figure 6:
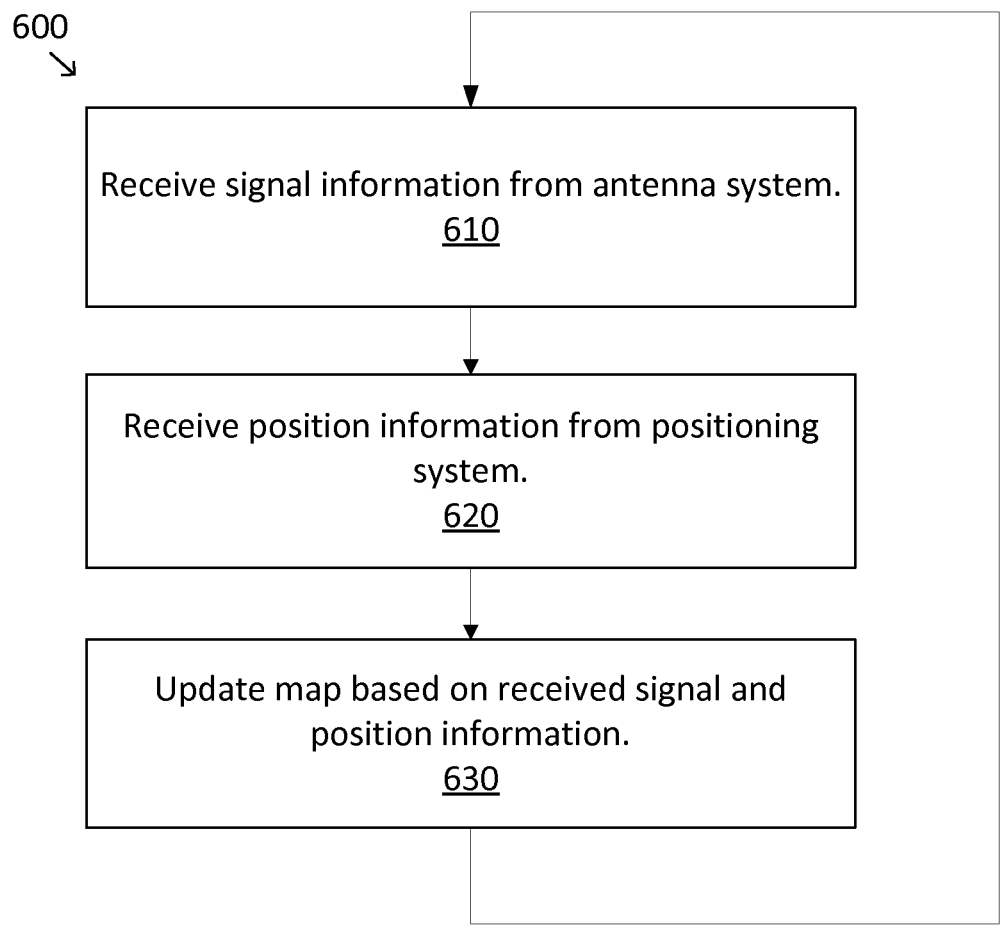
FIG. 6 is a simplified diagram of a method of underground line location according to some embodiments.

FIG. 6 is a simplified diagram of a method 600 of underground line location according to some embodiments. According to some embodiments, method 600 may be performed by a controller, such as controller 420, used in an underground line locator, such as locator 130. Method 600 may be used to record the location of one or more underground lines in a survey area. At a process 610, signal information is received from an antenna subsystem. The antenna subsystem may be an instance of antenna subsystem 210 and/or 310. The signal information received during process 610 may include raw data, such as an electrical current and/or voltage signal, and/or processed data, such as a magnitude, phase, angle, and/or gradient of a magnetic field (such as magnetic field 125). In general, the signal information depends upon the proximity of the user to an underground line. At a process 620, position information is received from a positioning system. The positioning system may be an instance of positioning system 420. The position information received during process 620 may include raw data, such as an electrical current and/or voltage signal, and/or processed data, such as GPS coordinates and/or relative position information. At a process 630, a map is updated based on the received signal and position information. The map may include a spatial representation of the survey area in one or more dimensions. When updating the map, the signal information received during process 610 is entered at the corresponding position determined based on position information received during process 620. After process 620, method 600 may be repeated as the user moves around the survey area, thereby gradually filling in the map with the collected signal information.

Some examples of controllers, such as processors 250 and 350 and/or controller 420 may include non-transient, tangible, machine readable media that include executable code that when run by one or more processors may cause the one or more processors to perform the processes of method 600. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An underground line locator comprising:
a first dual-axis antenna disposed at a first position on the underground line locator, the first dual-axis antenna determining first signal information associated with an alternating current (AC) magnetic field associated with an underground line; and
a second dual-axis antenna disposed at a second position on the underground line locator apart from the first position along an elongated portion of the line locator, the second dual-axis antenna determining second signal information associated with the AC magnetic field;
wherein:
the first signal information includes a first magnitude and a first angle indicating a direction perpendicular to the elongated portion; and
the second signal information includes a second magnitude determined along an axis defined by the direction perpendicular to the elongated portion indicated by the first angle.

2. The underground line locator of claim 1, wherein the first signal information further includes a first phase and the second magnitude is determined in phase with the first phase.

3. The underground line locator of claim 1, further comprising a positioning system configured to generate position information based on the location of the underground line locator.

4. The underground line locator of claim 1, wherein a controller is configured to update a map of a survey area based on the first and second signal information and the position information.

5. The underground line locator of claim 1, wherein each of the first and second dual-axis antennas comprise two or more co-located coils configured to measure fields in directions perpendicular to the elongated portion of the line locator.

6. The underground line locator of claim 5, wherein the two of the two or more coils are disposed as a crossed pair of antennas.

7. A method comprising:
  receiving, from a first dual-axis antenna disposed at a first position, first signal information associated with an alternating current (AC) magnetic field associated with an underground line, the first signal information including a first magnitude and a first angle indicating a direction perpendicular to the elongated portion;
  receiving, from a dual-axis second antenna disposed at a second position apart from the first position along an elongated portion of the line locator, second signal information associated with the AC magnetic field, the second signal information including a second magnitude determined along an axis along the direction perpendicular to the elongated portion defined by the first angle;
  receiving, from a positioning system, position information, the positioning information being based on the location of the underground line locator;
  updating a map of a survey area based on the first and second signal information and the position information.

8. The method of claim 7, wherein each of the first and second antennas comprise two or more coils that are co-located.

9. The method of claim 8, wherein the two of the two or more coils are disposed as a crossed pair of antennas.

* * * * *